US007949894B2

(12) United States Patent  
Joshi et al.

(10) Patent No.: US 7,949,894 B2
(45) Date of Patent: May 24, 2011

(54) SELF-HEALING CAPABILITIES IN A DIRECTORY SERVER

(75) Inventors: Chandrajit Gangadhar Joshi, Kothrud Pune (IN); Romil J Shah, Kothrud Pune (IN)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 12/189,291

(22) Filed: Aug. 11, 2008

(65) Prior Publication Data

US 2010/0037087 A1 Feb. 11, 2010

(51) Int. Cl.
G06F 11/00 (2006.01)
(52) U.S. Cl. .......................................................... 714/4
(58) Field of Classification Search ................. 714/4
See application file for complete search history.

(56) References Cited

U.S. PATENT DOCUMENTS

| | | | | |
|---|---|---|---|---|
| 7,149,892 | B2 * | 12/2006 | Freed et al. | 713/151 |
| 7,194,543 | B2 * | 3/2007 | Robertson et al. | 709/226 |
| 7,197,661 | B1 * | 3/2007 | Reynolds et al. | 714/4 |
| 7,376,967 | B1 * | 5/2008 | Hughes et al. | 726/14 |
| 7,444,536 | B1 * | 10/2008 | Jairath | 714/4 |
| 7,461,290 | B1 * | 12/2008 | Reynolds et al. | 714/4 |
| 7,716,730 | B1 * | 5/2010 | Droux et al. | 726/14 |
| 2002/0162020 | A1 * | 10/2002 | Bellaton et al. | 713/201 |
| 2003/0063742 | A1 * | 4/2003 | Neufeld et al. | 380/46 |
| 2006/0155997 | A1 * | 7/2006 | Fritzges et al. | 713/171 |
| 2006/0230443 | A1 * | 10/2006 | Yim | 726/12 |
| 2007/0186098 | A1 * | 8/2007 | Lingmann | 713/158 |
| 2007/0218912 | A1 * | 9/2007 | Song et al. | 455/445 |
| 2008/0104390 | A1 * | 5/2008 | VanHeyningen et al. | 713/151 |
| 2008/0216150 | A1 * | 9/2008 | Brabson et al. | 726/1 |
| 2009/0037763 | A1 * | 2/2009 | Adhya et al. | 714/4 |
| 2009/0037998 | A1 * | 2/2009 | Adhya et al. | 726/11 |
| 2009/0265553 | A1 * | 10/2009 | Balissat et al. | 713/168 |
| 2009/0300407 | A1 * | 12/2009 | Kamath et al. | 714/4 |
| 2009/0313470 | A1 * | 12/2009 | Bade et al. | 713/169 |

OTHER PUBLICATIONS

RSA Laboratories; "PKCS #11: Cryptographic Token Interface Standard"; Nov. 2001; pp. 1-200; v.2.11 r1. RSA Laboratories, Bedford, MA 01730, USA.

Sun Microsystems; "Java PKCS#11 Reference Guide"; May 2004; pp. 1-15; Sun Microsystems, 4120 Network Circle, Santa Clara, CA 95054, USA.

(Continued)

*Primary Examiner* — Robert Beausoliel
*Assistant Examiner* — Joshua P Lottich
(74) *Attorney, Agent, or Firm* — The Brevetto Law Group

(57) ABSTRACT

A novel manner of handling an error or exception caused by the unavailability of a slot or crypto hardware or communication network between server and hardware. As per this scheme, in the event of the unavailability of a particular slot in the hardware, the server may disable the SSL request processing within the server by setting a global "SSL Unavailable" flag. All the existing SSL requests within the server can be en-queued. If the error is because of unavailability of master slot, the server can establish a connection with a backup slot. If the error is because of unavailability of crypto hardware or communication network, then server may start a healer thread that will poll for the state of the hardware. If the exception is because of hardware reset, then server may cleanup earlier connection information and re-establish connection with the hardware, and enable SSL services.

20 Claims, 5 Drawing Sheets

OTHER PUBLICATIONS

Sun Microsystems; "Sun Crypto Accelerator 4000 Board Version 2.0 Installation and User's Guide" (book), chapter 5 entitled "Building PKCS#11 Applications for Use With the Sun Crypto Accelerator 4000 Board"; 2004; chap. 5; Sun Microsystems, 4120 Network Circle, Santa Clara, CA 95054, USA.

Shing Wai Chan; "Key Management and PKCS#11 Tokens in Sun Java System Application Server 8.1"; Sun Technical Articles; May 19, 2005; Sun Microsystems, 4120 Network Circle, Santa Clara, CA 95054, USA.

* cited by examiner

Healer Thread

SELF-HEALING CAPABILITIES IN A DIRECTORY SERVER

BACKGROUND

Authorized applications that require a highly secured environment for cryptographic components generally use a cryptographic card that serves as storage for cryptographic keys.

An LDAP (Lightweight Directory Access Protocol) directory normally uses cryptographic keys for SSL (Secure Sockets Layer) based authentication. The server establishes connection with the crypto hardware during startup using the vendor specific APIs (application programming interfaces). This connection is kept persistent throughout the lifetime of server. When the LDAP clients send requests to the server over SSL connection, the server retrieves a security certificate corresponding to the client from the hardware and compares it with the one provided by the client. If the two certificates match, the client is authenticated.

SUMMARY

Broadly contemplated herein, in accordance with at least one embodiment of the invention, is a novel manner of handling an error or exception caused by the unavailability of a slot or crypto hardware or communication network between server and hardware. As per this scheme, in the event of the unavailability of a particular slot in the hardware, the server will disable the SSL request processing within the server by setting a global "SSL Unavailable" flag. All the existing SSL requests within the server will be en-queued and the server will establish a connection with a backup slot. Thus, all SSL handshaking operations will be done using a backup slot having copies of all certificates present on the master slot. The "SSL Unavailable" flag will then be reset back to false and all the en-queued SSL requests will be processed as usual along with new incoming SSL request. If the error is because of unavailability of crypto hardware or communication network, then the server will start a healer thread that will poll for the state of the hardware. As soon as it detects that the hardware is up, it will re-establish connection with the hardware and enable SSL services by resetting a "SSL Unavailable" flag to false. If the exception is because of hardware reset, then the server will cleanup earlier connection information and re-establish connection with the hardware, and enable SSL services by resetting a "SSL Unavailable" flag to false.

In summary, this disclosure describes a method including an unavailable connection medium between a server and hardware, disabling SSL request processing associated with the server, remedying the unavailable connection medium to thereby reestablish a connection medium between the server and hardware, and thereafter re-enabling SSL services.

This disclosure also describes an apparatus including computer system hardware, an ascertainer which ascertains an unavailable connection medium between a server and the hardware, an SSL service manager which disables SSL request processing associated with the server, and a remedial element which remedies the unavailable connection medium, the SSL service manager acting to re-enable SSL services subsequent to remedying of the unavailable connection medium.

Furthermore, this disclosure also describes a program storage device readable by machine, tangibly embodying a program of instructions executable by the machine to perform a method including ascertaining an unavailable connection medium between a server and hardware, disabling SSL request processing associated with the server, remedying the unavailable connection medium to thereby reestablish a connection medium between the server and hardware, and thereafter re-enabling SSL services.

DETAILED DESCRIPTION

It will be readily understood that the embodiments of the invention, as generally described and illustrated in the Figures herein, may be arranged and designed in a wide variety of different configurations. Thus, the following more detailed description of the embodiments of the apparatus, system, and method of the embodiments of the invention, as represented in, FIGS. 1-5 is not intended to limit the scope, but is merely representative of selected embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that embodiment of the invention can be practiced without one or more of the specific details, or with other methods, components, materials, etc. In other instances, well-known structures, materials, or operations are not shown or described in detail to avoid obscuring aspects of embodiments of the invention.

The illustrated embodiments of the invention will be understood by reference to the drawings, wherein like parts are designated by like numerals or other labels throughout. The following description is intended only by way of example, and simply illustrates certain selected embodiments of devices, systems, and processes.

Figure 1:
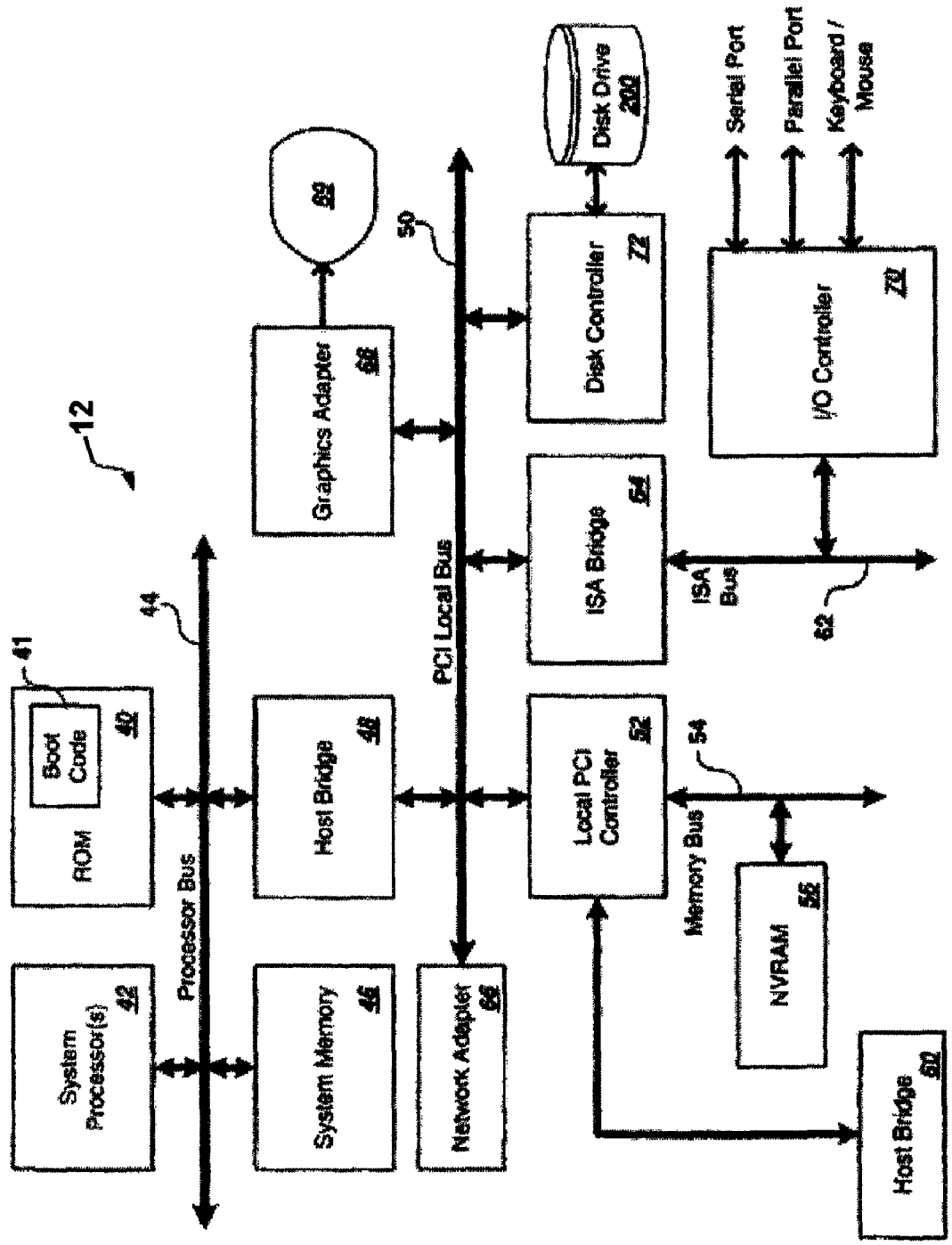
FIG. 1 schematically illustrates a computer system with which an embodiment of the invention can be used.

Referring now to FIG. 1, there is depicted a block diagram of an embodiment of a computer system 12. The embodiment depicted in FIG. 1 may be a notebook computer system, such as one of the ThinkPad® series of personal computers previously sold by the International Business Machines Corporation of Armonk, N.Y., and now sold by Lenovo (US) Inc. of Morrisville, N.C.; however, as will become apparent from the following description, the embodiments of the invention may be applicable to any data processing system. Notebook computers, as may be generally referred to or understood herein, may also alternatively be referred to as "notebooks", "laptops", "laptop computers" or "mobile computers".

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a local area network (LAN), and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports, including communication over a wide area network (WAN) such as the Internet. A disk controller 72 is in communication with a disk drive 200 for accessing external memory. Of course, it should be appreciated that the system 12 may be built with different chip sets and a different bus structure, as well as with any other suitable substitute components, while providing comparable or analogous functions to those discussed above.

Figure 2:
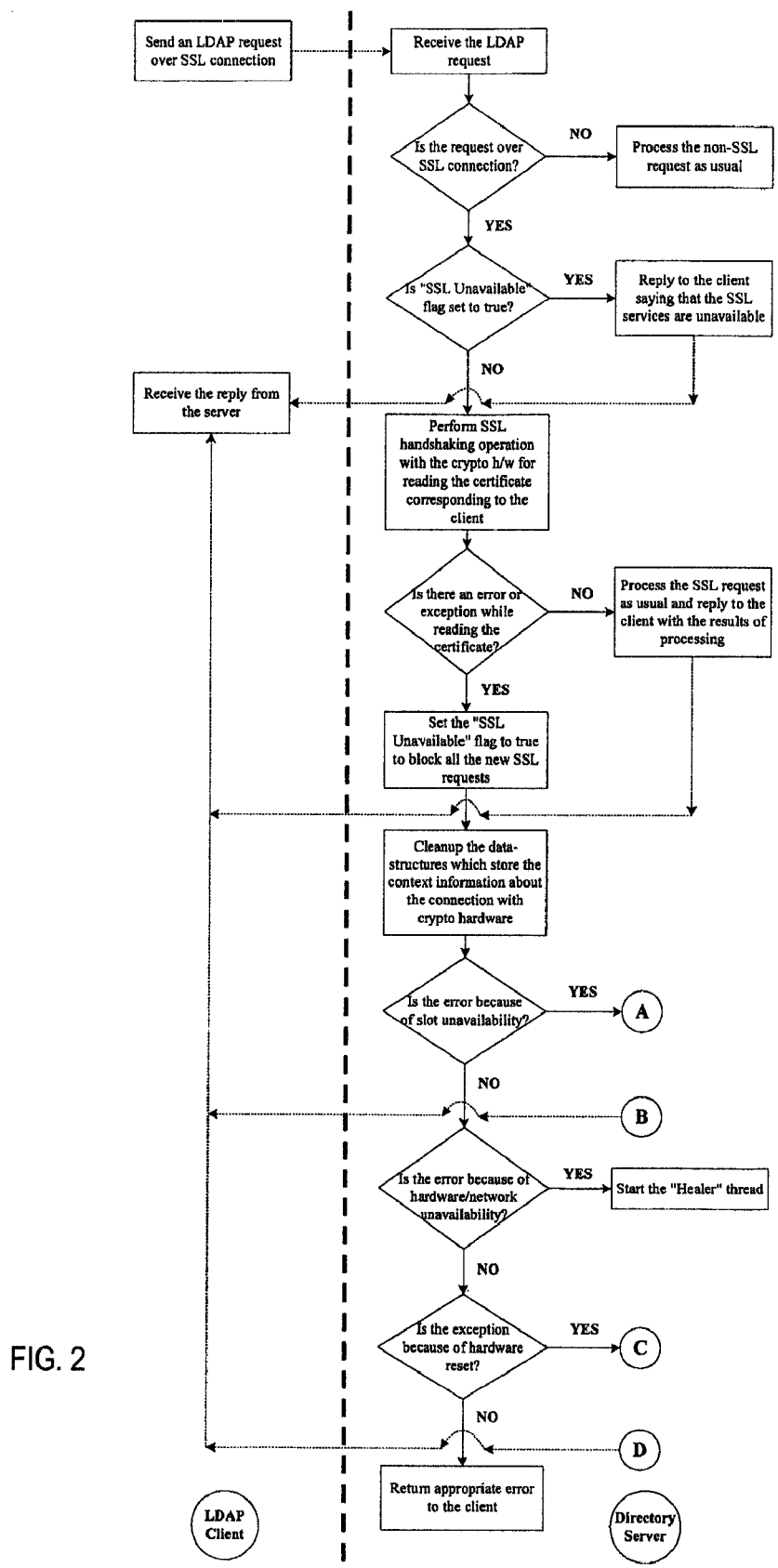
FIGS. 2, 3 and 4 depict a process in mainline code of a server.
Figure 3:
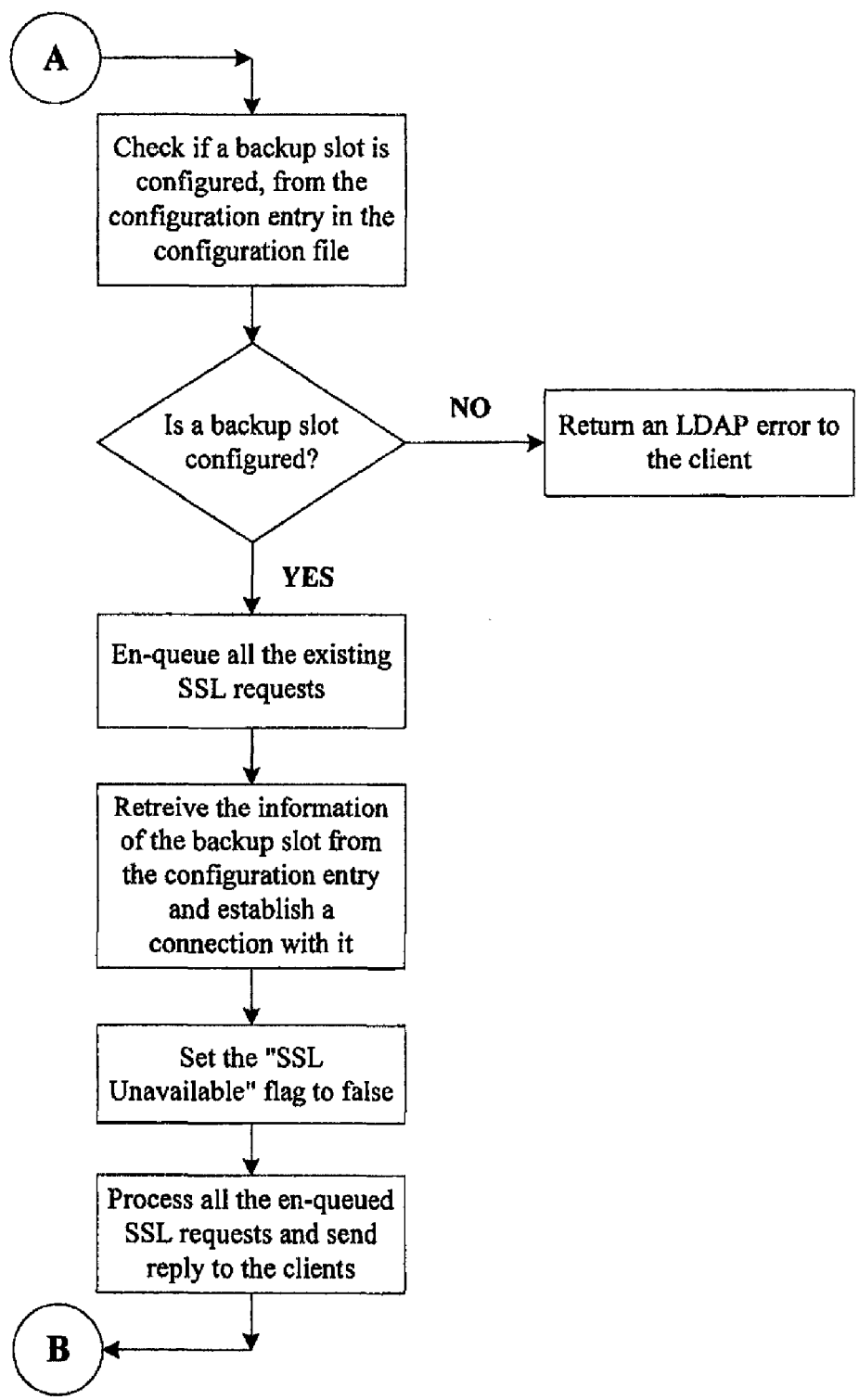
Figure 4:
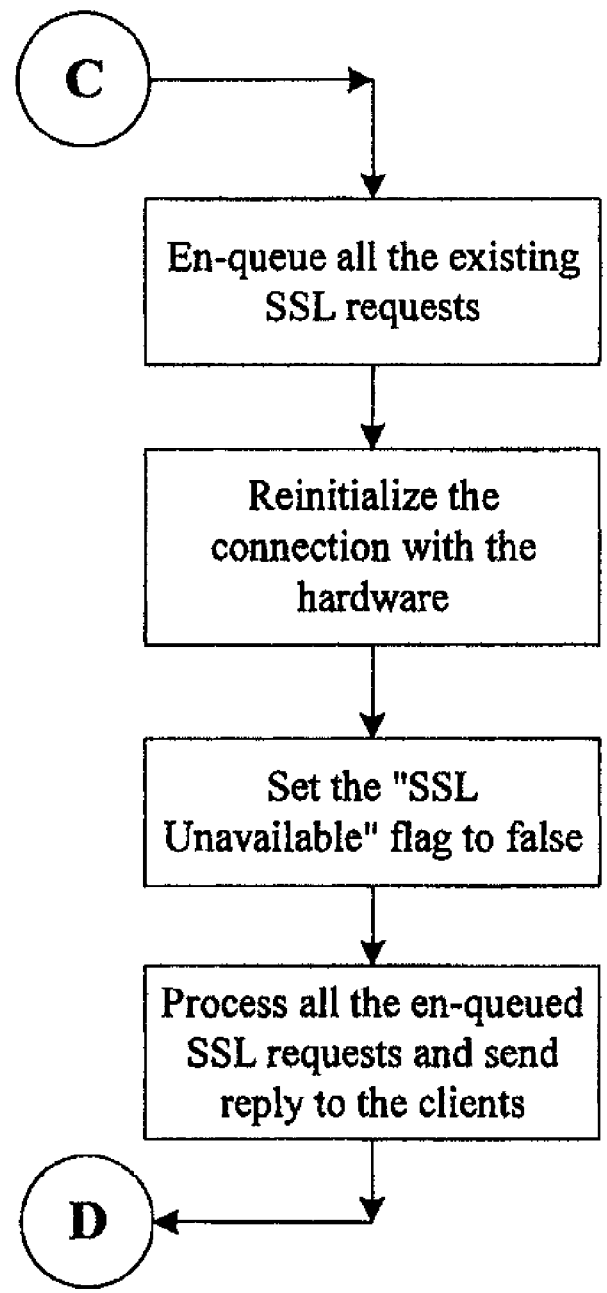
Figure 5:
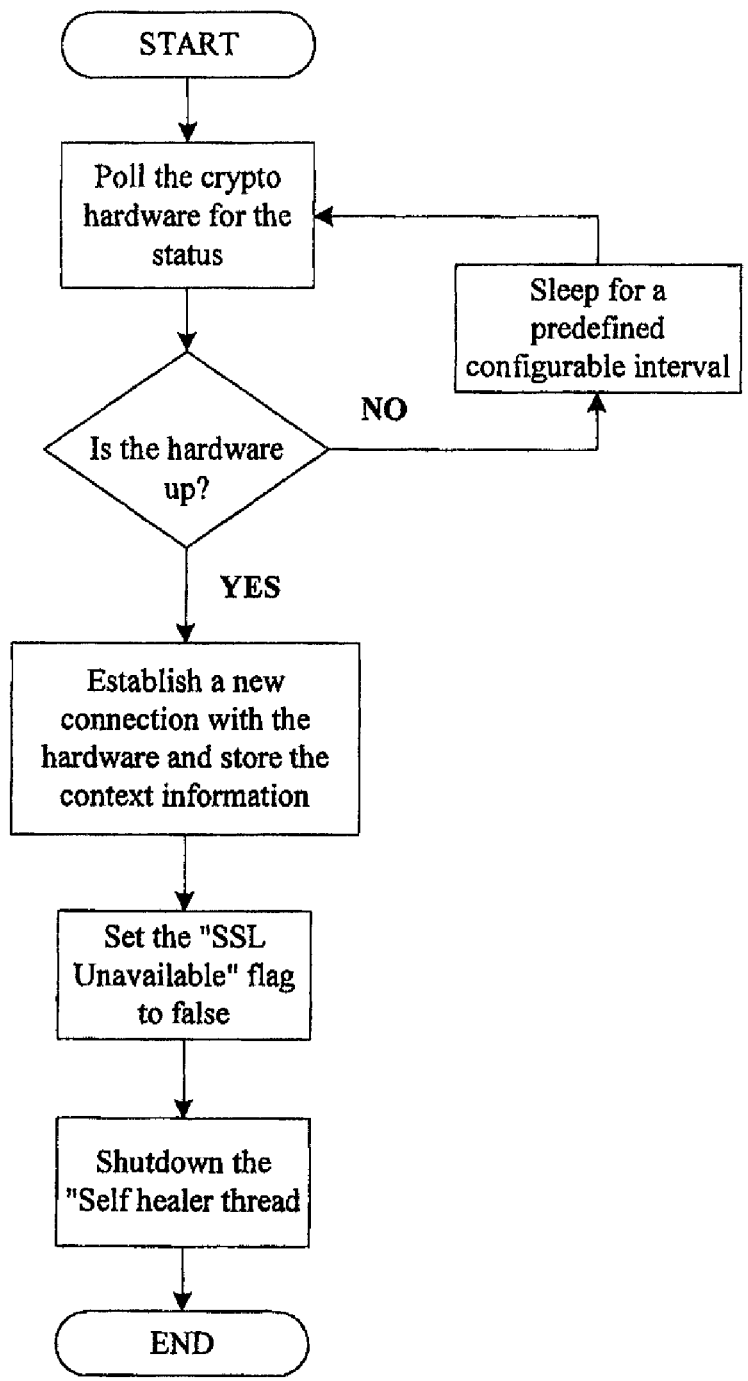
FIG. 5 depicts a process in a "healer" thread.

Reference may now be made herethroughout to the flowcharts provided in FIGS. 2, 3 and 4, corresponding to logic in mainline code of the server, and in FIG. 5, corresponding to logic of a "healer" thread in accordance with an embodiment of the invention. It should be understood that the processes broadly contemplated in accordance with FIGS. 2-5 can be applied to a very wide range of computer systems, including that indicated at 12 in FIG. 1.

As mentioned above, broadly contemplated herein, in accordance with at least one embodiment of the invention, is a novel manner of handling an error or exception caused by the unavailability of a slot or crypto hardware or communication network between server and hardware. As per this scheme, in the event of the unavailability of a particular slot in the hardware, the server may disable the SSL request processing within the server by setting a global "SSL Unavailable" flag. Existing SSL requests within the server may be en-queued and the server may establish a connection with a backup slot. Thus, all SSL handshaking operations may be done using a backup slot having copies of all certificates present on the master slot. The "SSL Unavailable" flag may then be reset back to false and the en-queued SSL requests may be processed as usual along with new incoming SSL request.

In case of h/w (hardware) or network unavailability, the server may disable the SSL request processing within the server by setting a global "SSL Unavailable" flag. It may also start a new thread that will serve the purpose of self-healing the server. This thread may start a status check loop that will poll the crypto hardware periodically.

In case of h/w reset, if the server tries to communicate with the h/w using the existing connection information which no longer exists, an unconditional exception or error might be returned by the crypto library. On receiving such exception or error the server may set the global "SSL Unavailable" flag and en-queue all the existing SSL requests. It may then re-initialize the connection with the hardware, reset the "SSL Unavailable" flag to false and process the en-queued SSL requests as usual along with new incoming SSL request.

Thus, to briefly summarize and recapitulate, in case of the unavailability of a master slot, the server may continue to serve the SSL requests by switching the connection to a backup slot. In case of hardware or network unavailability, this scheme may enable the server to remain available and hence serve the non-SSL requests as usual. It may also enable the server to start the SSL request processing automatically when the crypto hardware becomes available. In case of hardware reset, it may just reinitialize the connection with the hardware and resume the request processing, avoiding any downtime.

In order for this scheme to work, the administrator may configure a backup slot that holds the copy of certificates present in the master slot, so that server can establish connection with the backup slot if the master slot fails. An example of this LDIF configuration entry could be as given below:

dn: cn=SSL, cn=Configuration
ibm-slapdSslBackupSlotEnabled: true
ibm-slapdSslBackupSlotLabel: bkpslot
ibm-slapdSslBackupSlotPW: <password>
...
...
objectclass: top
objectclass: ibm-slapdConfigEntry
objectclass: ibm-slapdSSL
Where
ibm-slapdSslBackupSlotEnabled: Indicates that the backup slot is configured
ibm-slapdSslBackupSlotLabel: Name of the backup slot configured on the crypto hardware, which is used during connection establishment
ibm-slapdSslBackupSlotPW: Password used to connect to the backup slot Note: There might be more attributes required in the configuration entry, which are necessary to connect to the hardware, depending on the type of interface used for connection, e.g., PKCS#11 (As well-known to those of ordinary skill in the art, PKCS refers to a group of Public Key Cryptography Standards devised and published by RSA Security. PKCS#11 is one of the family of PKCS. It defines a platform-independent API to cryptographic tokens, such as Hardware Security Modules and smart cards. It is often used to refer to the API as well as the standard that defines it.)

The flow control of the directory server may be as follows:
   If the LDAP request is over the SSL connection, check if the global "SSL Unavailable" flag is true. If yes, reply to the client saying that the SSL services are unavailable. Else process the SSL request in the normal fashion.
   If an error or an exception occurs while communicating with the crypto hardware, set, the "SSL Unavailable" flag to true to reply to all the new SSL requests that the SSL services are unavailable.
   Flush out the connection handle and other hardware related connection data-structures that hold the context information of the connection.

The disclosure now turns to a few illustrative examples.
Case I
If the error is because of unavailability of the master slot, check if a backup slot is configured. This may be done by reading the LDIF entry corresponding to the crypto hardware configuration in the configuration file.

If the backup slot is configured, all the existing SSL requests may be en-queued so that those can be processed afterwards. Then a connection with the backup slot may be initialized using the information provided for backup slot in the configuration entry. The global "SSL Unavailable" flag may be set to false so that new SSL requests can be accepted. Finally, all the existing en-queued requests may be processed.

Case II

If there is an error because of the unavailability of hardware or a communication network, the "Healer" thread may be started. This thread may start a hardware polling loop. If the polling shows that the hardware is available, it may re-initialize and establish a new connection with the crypto hardware so that the server can start processing SSL requests. It may also set the "SSL Unavailable" flag to false.

Case III

If the exception is because of reset of crypto hardware, all existing SSL requests may be en-queued. The connection with the h/w may be reinitialized, then the "SSL Unavailable" flag may be reset to false to allow all new SSL requests again. Finally, all en-queued SSL requests may be processed.

It is to be understood an embodiments of the invention may include elements that may be implemented on at least one general-purpose computer running suitable software programs. These may also be implemented on at least one Integrated Circuit or part of at least one Integrated Circuit. Thus, it is to be understood that the embodiments of the invention may be implemented in hardware, software, or a combination of both.

Generally, embodiments may take the form of an entirely hardware embodiment, an entirely software embodiment or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Generally, although illustrative embodiments of the invention have been described herein with reference to the accompanying drawings, it is to be understood that this disclosure is not limited to those precise embodiments.

What is claimed is:

1. A method comprising:
    ascertaining an unavailable connection medium between a server and hardware;
    disabling SSL request processing associated with the server by setting a global flag indicating unavailability of SSL services;
    remedying the unavailable connection medium to thereby reestablish a connection medium between the server and hardware; and
    thereafter re-enabling SSL services.

2. The method according to claim 1, wherein said re-enabling comprises resetting the global flag to enable SSL services.

3. The method according to claim 1, further comprising the step of enqueuing existing SSL requests in the server.

4. The method according to claim 1, wherein:
    said ascertaining comprises ascertaining unavailability of a master slot;
    said remedying comprises establishing a connection between the server and a backup slot.

5. The method according to claim 4, wherein the backup slot includes copies of certificates present on the master slot.

6. The method according to claim 1, wherein:
    said ascertaining comprises ascertaining unavailability of at least one of the following (a) and (b): (a) crypto hardware, and (b) a communication network; and
    said remedying comprises starting a healer thread.

7. The method according to claim 6, wherein said remedying further comprises:
    employing the healer thread to poll a state of hardware; and
    reestablishing a hardware connection.

8. The method according to claim 1, wherein:
    said ascertaining comprises ascertaining a hardware reset which accounts for an unavailable connection medium; and
    said remedying comprises cleaning up earlier connection information.

9. The method according to claim 8, wherein said remedying further comprises reestablishing a hardware connection.

10. An apparatus comprising:
    computer system hardware;
    an ascertainer which ascertains an unavailable connection medium between a server and said hardware;
    an SSL service manager which disables SSL request processing associated with the server; and
    a remedial element which remedies the unavailable connection medium;

said SSL service manager acting to re-enable SSL services subsequent to remedying of the unavailable connection medium;

wherein said SSL service manager is configured to set a global flag indicating unavailability of SSL services, and subsequent to remedying by said remedial element, reset the global flag to enable SSL services.

11. The apparatus according to claim 10, wherein:

said ascertainer acts to ascertain unavailability of a master slot; and said remedial element acts to establish a connection between the server and a backup slot.

12. The apparatus according to claim 11, wherein the backup slot includes copies of certificates present on the master slot.

13. The apparatus according to claim 12, wherein said remedial element further acts to:

employ the healer thread to poll a state of hardware; and reestablish a hardware connection.

14. The apparatus according to claim 10, wherein:

said ascertainer acts to ascertain unavailability of at least one of the following (a) and (b): (a) crypto hardware, and (b) a communication network; and said remedial element acts to start a healer thread.

15. The apparatus according to claim 10, wherein:

said ascertainer acts to ascertain a hardware reset which accounts for an unavailable connection medium; and said remedial element acts to clean up earlier connection information.

16. The apparatus according to claim 15, wherein said remedial element further acts to reestablish a hardware connection.

17. A non-transitory program storage device readable by machine, tangibly embodying a program of instructions executable by the machine to perform a method comprising:

ascertaining an unavailable connection medium between a server and hardware;

disabling SSL request processing associated with the server by setting a global flag indicating unavailability of SSL services;

remedying the unavailable connection medium to thereby reestablish a connection medium between the server and hardware; and thereafter re-enabling SSL services.

18. The program storage device according to claim 17, wherein the method further comprises:

said ascertaining comprises ascertaining unavailability of a master slot; and said remedying comprises establishing a connection between the server and a backup slot.

19. The program storage device according to claim 17, wherein the method further comprises:

said ascertaining comprises ascertaining unavailability of at least one of the following (a) and (b): (a) crypto hardware, and (b) a communication network; and said remedying comprises starting a healer thread.

20. The program storage device according to claim 17, wherein the method further comprises:

said ascertaining comprises ascertaining a hardware reset which accounts for an unavailable connection medium; and said remedying comprises cleaning up earlier connection information.

* * * * *